United States Patent [19]

Cherier et al.

[11] 4,314,246
[45] Feb. 2, 1982

[54] DEVICE FOR TRANSMITTING RADIOPHONIC SIGNALS IN SECONDARY RADAR EQUIPMENT

[75] Inventors: Jacques Cherier; Albert Dupressoir; Olivier Aubergeon, all of Paris, France

[73] Assignee: Thomson-CSF, Paris, France

[21] Appl. No.: 147,294

[22] Filed: May 6, 1980

[30] Foreign Application Priority Data

May 8, 1979 [FR] France ............................ 79 11630

[51] Int. Cl.³ ..................... G01S 13/78; G01S 13/87
[52] U.S. Cl. ................................ 343/6 R; 343/6.5 R
[58] Field of Search ............................ 343/6 R, 6.5 R

[56] References Cited

U.S. PATENT DOCUMENTS

| 3,122,737 | 2/1964 | Setrin | 343/6.5 R |
| 3,320,610 | 5/1967 | Lassetter | 343/6 R |
| 3,956,747 | 5/1976 | Leypold et al. | 343/6 R |

Primary Examiner—T. H. Tubbesing
Attorney, Agent, or Firm—Cushman, Darby & Cushman

[57] ABSTRACT

The invention relates to the transmission of radiophonic signals and signals required for interrogating targets, in secondary radar equipment.

So as to prevent the antenna provided for transmitting radiophonic signals from being disturbed because of its proximity to the non-directional antenna of the IFF, this latter is used to transmit both the interrogation signals and the radiophonic signals, a hybrid coupler disposed in the transmission circuit transmitting in a totally different way the two kinds of signals.

5 Claims, 1 Drawing Figure

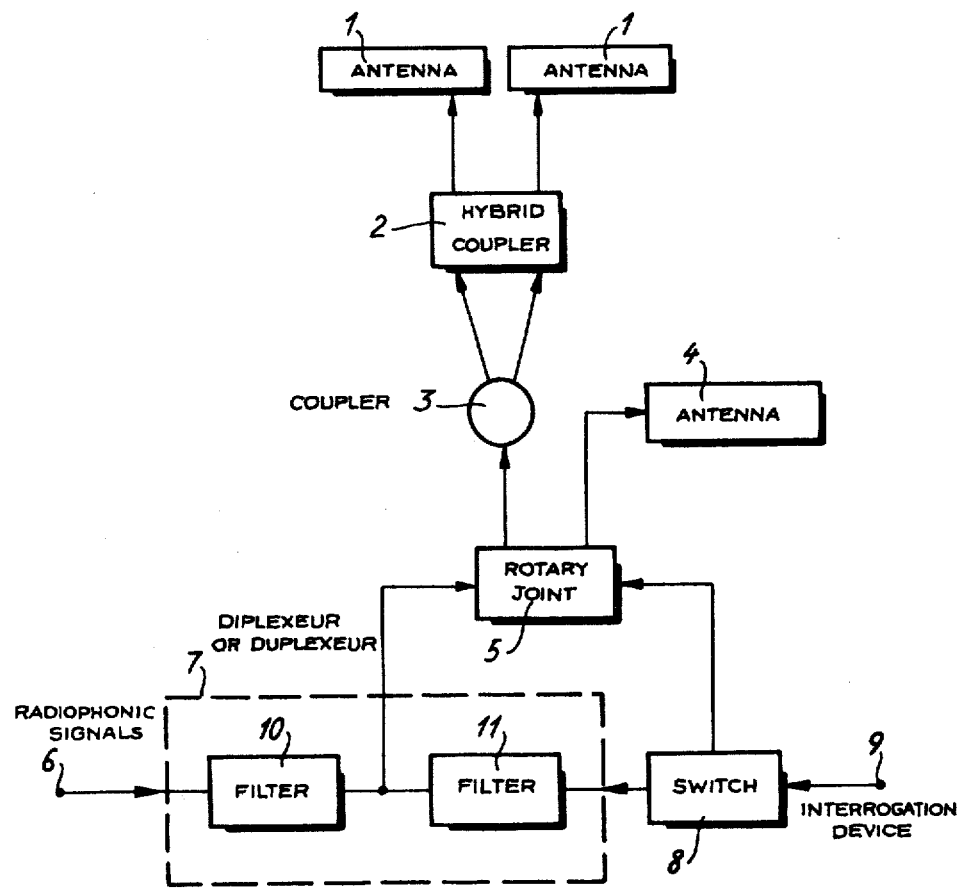

DEVICE FOR TRANSMITTING RADIOPHONIC SIGNALS IN SECONDARY RADAR EQUIPMENT

BACKGROUND OF THE INVENTION

The present invention relates to a device for transmitting radiophonic signals in secondary radar equipment. More precisely, such radar equipment is equipped with an interrogation device known under the abbreviation IFF and therefore comprises two antennae, one directional, the other omnidirectional or having in its radiation diagram zones with zero or very low gain.

These two antennae are supplied alternately according to a predetermined sequence for obtaining, on reception, echoes from the same target corresponding to a law of amplitude thus predetermined which enables them to be distinctly separated from spurious echoes. Moreover, interrogated targets, generally airplanes, are fitted with transponders which, receiving the impulses emitted by the interrogation device, emit in response towards this radar a coded signal allowing it to be identified. At this stage of the information about the target the operator of the radar generally enters into direct radiophonic communication with the interrogated target.

In the prior art, the antennae used for these radiophonic connections are of the whip or sword type and are disposed in the immediate vicinity of the antennae of the interrogation device especially in the cases where the equipment is carried for example by a truck or a tank. These antennae present several drawbacks:

- their matching is very difficult because of the vehicle on which they are generally fixed;
- their radiation diagrams may present angular zones with very low gain because of the presence of the antennae of the interrogation device forming an obstacle which disturbs the proper operation of the radiophonic antennae.

BRIEF SUMMARY OF THE INVENTION

The device of the invention seeks to remedy these drawbacks by using the non-directional antenna of the interrogation device as antenna for transmitting radiophonic signals.

The above and other objects, features and advantages of the present invention will become apparent from the following description, given solely by way of non-limiting illustration, when taken in conjunction with the accompanying drawings.

DESCRIPTION OF THE DRAWING

The single FIGURE shows the general diagram of the device of the invention.

DESCRIPTION OF THE PREFERRED EMBODIMENT

This device comprises a non-directional antenna 1 connected to a rotary joint 5 by means of a hybrid coupler 2 and a coupler 3 of the 3 dB type. A channel switch 8 is connected on the one hand to a directional antenna 4 by means of a rotary joint 5 and on the other hand to coupler 3 by means of a diplexer or duplexer 7 and rotary joint 5 also. The diplexer or duplexer 7 is connected to the transmission-reception circuit for the radiophonic signals through a terminal 6; channel switch 8 is connected to the interrogation device through a terminal 9.

Since all these circuits are reciprocals it is possible to reason only about the transmission mode, for example, as will be the case in the following description.

The operation of this device is then the following for transmitting:

the operation of the interrogation device and the radiophonic transmission are simultaneous.

In accordance with the operating mode of the interrogation device, the channel switch 8 transmits the signals from terminal 9 alternately to directional antenna 4 and to non-directional antenna 1. Channel switch 8 is directly controlled by the interrogation device not shown in the FIGURE. For a first position of this channel switch 8, the signals from terminal 9 are transmitted to the directional antenna 4 through the rotary joint 5. For a second position of this channel switch 8, the signals from terminal 9 are transmitted to the diplexer or duplexer 7, then to a coupler 3 through the rotary joint 5. This coupler 3 divides the signals received into signals of equal amplitude which are transmitted to a hybrid coupler 2. The outputs of this hybrid coupler 2 feed the non-directional antenna 1.

In accordance with the radiophonic transmitting mode of operation, the signals of terminal 6 come from the transmission-reception circuit not shown in the FIGURE. These signals, through diplexer or duplexer 7 and rotary joint 5, are then transmitted to coupler 3. This latter divides the received signal into two signals of equal amplitude which are applied to the hybrid coupler 2.

The hybrid coupler 2 is generally designed so that, fed with the signals from the interrogation device connected to terminal 9, it feeds the two non-directional parts of antenna 1 with phase-opposed signals thus allowing a very small gain of the antenna to be obtained in the direction of its axis.

The interrogation devices use waves whose frequencies are high (between 600 MHz and 750 MHz or close to 1030 MHz or 1090 MHz); on the other hand, the frequencies of the radiophonic waves are substantially lower, generally in a range extending from 200 MHz to 450 MHz.

For this reason, for the signals used in the radiophonic transmissions, the operation of the hybrid coupler 2 is modified; being designed to deliver phase-opposed waves for high frequencies, it will operate as a simple energy divider for these low-frequency signals.

The signals from this hybrid coupler 2, feeding the non-directional antenna 1, are in phase, thus giving a substantially isotrope radiation diagram for these radiophonic signals.

Despite a relative mismatching for the radiophonic signals from non-directional antenna 1, experience has shown that the performances of the non-directional antenna 1 for the transmission of radiophonic signals are good, better at all events than those of whip or sword antennae, the disturbances caused by the presence of the antenna of the interrogation device no longer existing. The radiation diagram due to the signals from the interrogation device of the non-directional antenna 1 is not disturbed by the superimposition of the radiation diagram due to the radiophonic signals from terminal 6.

The diplexer or duplexer 7 may be advantageously replaced by two filters 10 and 11 situated respectively in the path of the radiophonic signals from terminal 6 and of those from the interrogation device through the channel switch 8. A non-limiting choice consists in using for filter 10 the low-pass type and for filter 11 the band-pass type, the passband of filter 11 is such that it then surrounds the frequency used by the interrogation device, and the rejection frequency of the low-pass filter 10 is chosen greater than the radiophonic signal frequency.

The hybrid coupler 2 may be of any type, the only condition for its operation being that it must deliver, from two in-phase waves, two phase-opposed waves in the frequency ranges used by the interrogation devices.

Thus has been described a device for transmitting by means of a single group of two antennae signals from an interrogation device and radiophonic signals in a secondary radar system.

It is apparent that within the scope of the invention, modifications and different arrangements can be made other than are here disclosed. The present disclosure is merely illustrative with the invention comprehending all variations thereof.

What is claimed is:

1. A device for transmitting radiophonic signals and signals from an interrogation device known under the abbreviation IFF of a secondary radar comprising a non-directional antenna and a directional antenna, wherein the antenna for transmitting radiophonic signals is the non-directional antenna of the interrogation device.

2. The transmission device as claimed in claim 1, wherein a hybrid coupler is provided feeding the non-directional antenna, this hybrid coupler being such that, receiving the signals from the interrogation device from a first terminal, it delivers to the non-directional antenna two signals of equal amplitude and opposite in phase and that, receiving the signals from the radiophonic transmission-reception circuit from a second terminal, it delivers to the non-directional antenna two signals of equal amplitude and in phase.

3. The transmission device as claimed in claims 1 or 2, wherein there is further provided a coupler connected to the non-directional antenna through a hybrid coupler, a channel switching circuit whose input is connected to the transmission-reception circuit of the interrogation device through a first terminal and the outputs respectively, on the one hand to the coupler through a diplexer or duplexer circuit and a rotary joint and, on the other hand, to a directional antenna by means of the rotary joint, the diplexer or duplexer circuit being connected by a second terminal to the transmission-reception circuits of the radiophonic signals.

4. The transmission device as claimed in claim 3, wherein the diplexer or duplexer circuit comprises an assembly of two filters.

5. The transmission device as claimed in claim 4, wherein one filter is of the low-pass type and the other of the band-pass type.

* * * * *